US009956995B1

(12) United States Patent
Neighbors et al.

(10) Patent No.: US 9,956,995 B1
(45) Date of Patent: May 1, 2018

(54) DROP TAILGATE WITH INTEGRATED STEP

(71) Applicants: Kyle Neighbors, Milford, MI (US); Jeffery E Long, Canton, MI (US); Jereme A Berube, Sterling Heights, MI (US); Jimmy L Suder, Ortonville, MI (US)

(72) Inventors: Kyle Neighbors, Milford, MI (US); Jeffery E Long, Canton, MI (US); Jereme A Berube, Sterling Heights, MI (US); Jimmy L Suder, Ortonville, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days. days.

(21) Appl. No.: 15/400,347

(22) Filed: Jan. 6, 2017

(51) Int. Cl.
| | |
|---|---|
| *B62D 33/027* | (2006.01) |
| *B62D 33/037* | (2006.01) |
| *B60R 3/00* | (2006.01) |
| *B60P 1/267* | (2006.01) |
| *B62D 33/03* | (2006.01) |

(52) U.S. Cl.
CPC ............ *B62D 33/027* (2013.01); *B60P 1/267* (2013.01); *B60R 3/00* (2013.01); *B62D 33/0273* (2013.01); *B62D 33/03* (2013.01); *B62D 33/037* (2013.01)

(58) Field of Classification Search
CPC .... B62D 33/02; B62D 33/023; B62D 33/027; B62D 33/0273; B62D 33/03; B60P 1/435; B60P 1/267; B60R 3/00; B60R 3/3007
USPC .................................................. 296/57.1, 62
See application file for complete search history.

(56) References Cited

U.S. PATENT DOCUMENTS

| | | | | |
|---|---|---|---|---|
| 2,991,118 A * | 7/1961 | Sleger | ....................... | B60R 3/00 182/90 |
| 4,846,487 A * | 7/1989 | Criley | ....................... | B60R 3/02 105/447 |
| 5,312,150 A * | 5/1994 | Quam | ....................... | B60R 3/02 296/57.1 |
| 5,707,095 A * | 1/1998 | Pribak | ................ | B62D 33/0273 16/82 |
| 5,820,193 A * | 10/1998 | Straffon | .................... | B60R 3/02 182/127 |
| 6,267,429 B1 * | 7/2001 | Kuzmich | .................. | B60P 1/26 296/50 |
| 6,454,338 B1 * | 9/2002 | Glickman | ............... | B60P 1/435 296/26.1 |
| 8,070,206 B2 * | 12/2011 | Zielinsky | ........... | B62D 33/0273 16/82 |

(Continued)

*Primary Examiner* — Gregory A Blankenship
(74) *Attorney, Agent, or Firm* — Ralph E. Smith

(57) ABSTRACT

A tailgate assembly is provided for a vehicle having a cargo area disposed between first and second bedsides. A tailgate having at least one step is pivotally supported on the first and second besides. A tailgate latch assembly releasably retains the tailgate in a stowed position. First and second swing links are pivotally connected to first and second close faces of the tailgate. First and second swing link latch assemblies releasably retain the first and second swing links in a stored position. First and second support cables are connected to the first and second swing links to limit rotation of the tailgate between the stowed position and a first open position when the first and second swing links are in the stored position and to limit rotation between the first open position and a second open position when the first and second swing links are in a deployed position.

20 Claims, 9 Drawing Sheets

(56) References Cited

U.S. PATENT DOCUMENTS

| | | | |
|---|---|---|---|
| 8,070,208 B2 * | 12/2011 | Zielinsky | B62D 33/0273 16/82 |
| 8,075,038 B2 * | 12/2011 | Zielinsky | B62D 33/0273 16/82 |
| 8,348,325 B2 * | 1/2013 | Hausler | B62D 33/0273 296/51 |
| 9,434,317 B2 | 9/2016 | Nania | |
| 9,623,803 B1 * | 4/2017 | Martins | B60R 3/02 |
| 2011/0057469 A1 * | 3/2011 | Zielinsky | B60P 1/267 296/57.1 |

* cited by examiner

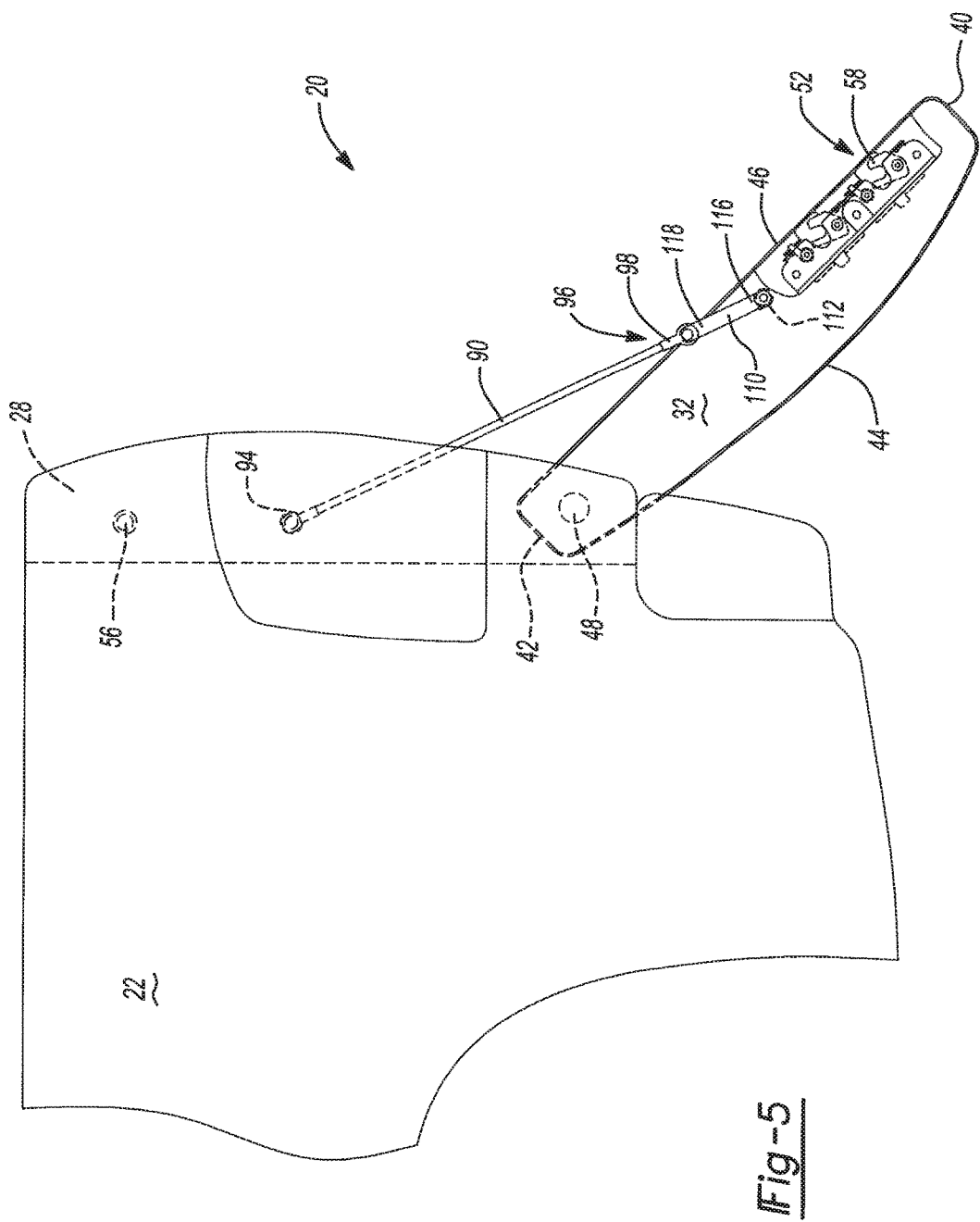

DROP TAILGATE WITH INTEGRATED STEP

FIELD

The present disclosure generally relates to tailgate assemblies for vehicles with cargo areas. Such vehicles may include, but are not limited to, pick-up trucks.

BACKGROUND

This section provides background information related to the present disclosure which is not necessarily prior art.

Many of today's vehicles have a cargo area for hauling items. Typically, the cargo area is arranged at the rear of a vehicle, where a tailgate assembly opens and closes to provide access to the cargo area. Examples of such vehicles are plentiful, including but not limited to: pick-up trucks, sport utility vehicles (SUVs), vans, minivans, and cross-over vehicles. Individuals often find it difficult to step into and out of the cargo area of a vehicle because the floor of the cargo area is typically well above ground level. In order to provide easier access into and out of the cargo area, vehicle manufacturers have begun incorporating a step into the rear corners of the vehicle. For example, U.S. Pat. No. 9,434,317 to Nania discloses steps incorporated into each corner of a rear bumper. The problem with this approach and others like it is that finding the step when stepping back down from (i.e. exiting) the cargo area is difficult due to such steps being located at the sides of the vehicle. Additionally, the height of such a step is limited to the height of the rear bumper, which is typically well above ground level. Accordingly, there remains a need for improved ingress and egress into and out of the cargo area of a vehicle.

SUMMARY

This section provides a general summary of the disclosure and is not a comprehensive disclosure of its full scope or ail of its features.

A tailgate assembly for a vehicle having a cargo area is disclosed herein. The cargo area of the vehicle is disposed between a first bedside and a second bedside. The tailgate assembly includes a tailgate having an exterior surface, an interior surface, and a perimeter defined by a first close face, a second close face, a top, and a bottom. The tailgate is configured to be pivotally supported on the first and second besides of the vehicle for movement between a stowed position and a plurality of open positions. The tailgate assembly includes at least one tailgate latch assembly that releasably retains the tailgate in the stowed position. The tailgate assembly also includes first and second support cables. The first support cable extends between a first support cable bedside end and a first support cable tailgate end. The first support cable bedside end is configured to be attached to the first bedside of the vehicle. Similarly, the second support cable extends between a second support cable bedside end and a second support cable tailgate end. The second support cable bedside end is configured to be attached to the second bedside of the vehicle.

The tailgate assembly further comprises first and second swing link assemblies. The first swing link assembly includes a first swing link, a first swing link pivot, and a first swing link latch assembly. The first swing link extends between a first swing link proximal end and a first swing link distal end. The first swing link pivot pivotally connects the first swing link proximal end to the first close face of the tailgate to permit rotation of the first swing link between a stored position and a deployed position. The first swing link latch assembly releasably retains the first swing link in the stored position. The second swing link assembly includes a second swing link, a second swing link pivot, and a second swing link latch assembly. The second swing link extends between a second swing link proximal end and a second swing link distal end. The second swing link pivot pivotally connects the second swing link proximal end to the second close face of the tailgate to permit rotation of the second swing link between a stored position and a deployed position. The second swing link latch assembly releasably retains the second swing link in the stored position. The first support cable tailgate end is connected to the first swing link distal end and the second support cable tailgate end connected to the second swing link distal end such that the tailgate is limited to rotation between the stowed position and a first open position when the first and second swing links are in the stored position. Meanwhile, further rotation of the tailgate between the first open position and a second open position is permitted when the first and second swing links are in the deployed position.

At least one step is disposed along the interior surface of the tailgate. This step allows individuals to more easily climb into or step down from the cargo area of the vehicle when the tailgate is rotated to the second open position. Advantageously, this provides improved access into and out of the cargo area. Because the step is provided on the interior surface of the tailgate, it is easier to see from inside the cargo area and does not require an individual to side-step around the first and second bedsides when stepping down from the cargo area. Additionally, by locating the step on a drop-down tailgate, the height of the step can be brought closer to ground level because step height is not dependent on the height of the rear bumper.

The design of the first and second swing links is advantageous for additional reasons. First, the first and second swing links provide individuals with a choice between two tailgate open positions. As a result, when ingress and egress into the cargo area is not necessary, the tailgate can be left in the first open position, where the interior surface of the tailgate provides a substantially seamless extension of the floor of the cargo area. Second, by attaching the first and second swing links to the first and second close faces of the tailgate, respectively, the first and second swing links, as well as the first and second support cables, are positioned between the first and second close faces of the tailgate and the first and second bedsides when the tailgate is in the stowed position. This is aesthetically more pleasing because the first and second swing links and the first and second support cables are hidden from view when the tailgate is in the stowed position. In addition, this arrangement protects the first and second swing links and the first and second support cables from environmental corrosion and impact damage because these components are not left exposed to the environment or to shifting cargo in the cargo area when the tailgate is in the closed position.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a side elevation view of the exemplary tailgate assembly illustrated in FIG. 1 where the tailgate is shown in a second open position;

DETAILED DESCRIPTION

Figure 1:
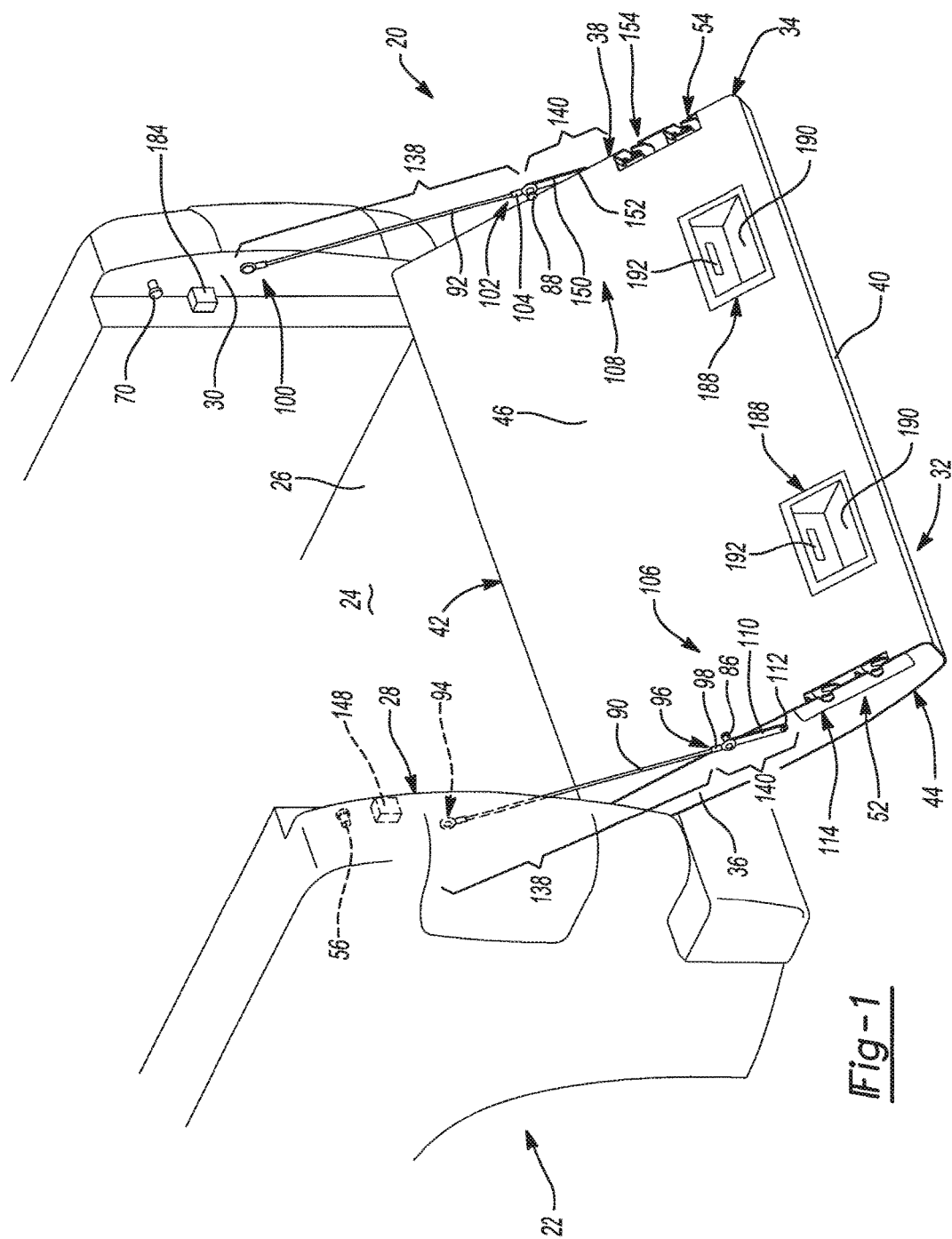
FIG. 1 is a rear perspective view of an exemplary tailgate assembly constructed in accordance with the subject disclosure.

Referring to the Figures, wherein like numerals indicate corresponding parts throughout the several views, a tailgate assembly 20 for a vehicle 22 having a cargo area 24 is illustrated.

Example embodiments are provided so that this disclosure will be thorough, and will fully convey the scope to those who are skilled in the art. Numerous specific details are set forth such as examples of specific components and devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top," "bottom," "interior," "exterior," "distal," "proximal," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the Figures.

With reference to FIG. 1, the tailgate assembly 20 and cargo area 24 of the vehicle 22 is illustrated. The cargo area 24 of the vehicle 22 is bounded by a floor 26, a first bedside 28, and a second bedside 30. The first and second bedsides 28, 30 are laterally spaced apart (i.e. arranged on the left and right sides of the vehicle 22) on opposing sides of the floor 26. When the vehicle 22 is resting upright on level ground, the floor 26 of the cargo area 24 will typically extend horizontally and the first and second bedsides 28, 30 will typically extend vertically. The vehicle 22 in the Figures is illustrated as a pick-up truck. However, it should be appreciated that the subject invention is not limited to pick-up trucks and applies to a number of different vehicle types. By way of example and without limitation, the subject invention may be used in connection with sport utility vehicles (SUVs), vans, minivans, and cross-over vehicles, all of which have cargo areas 24 and first and second bedsides 28, 30.

Figure 2:
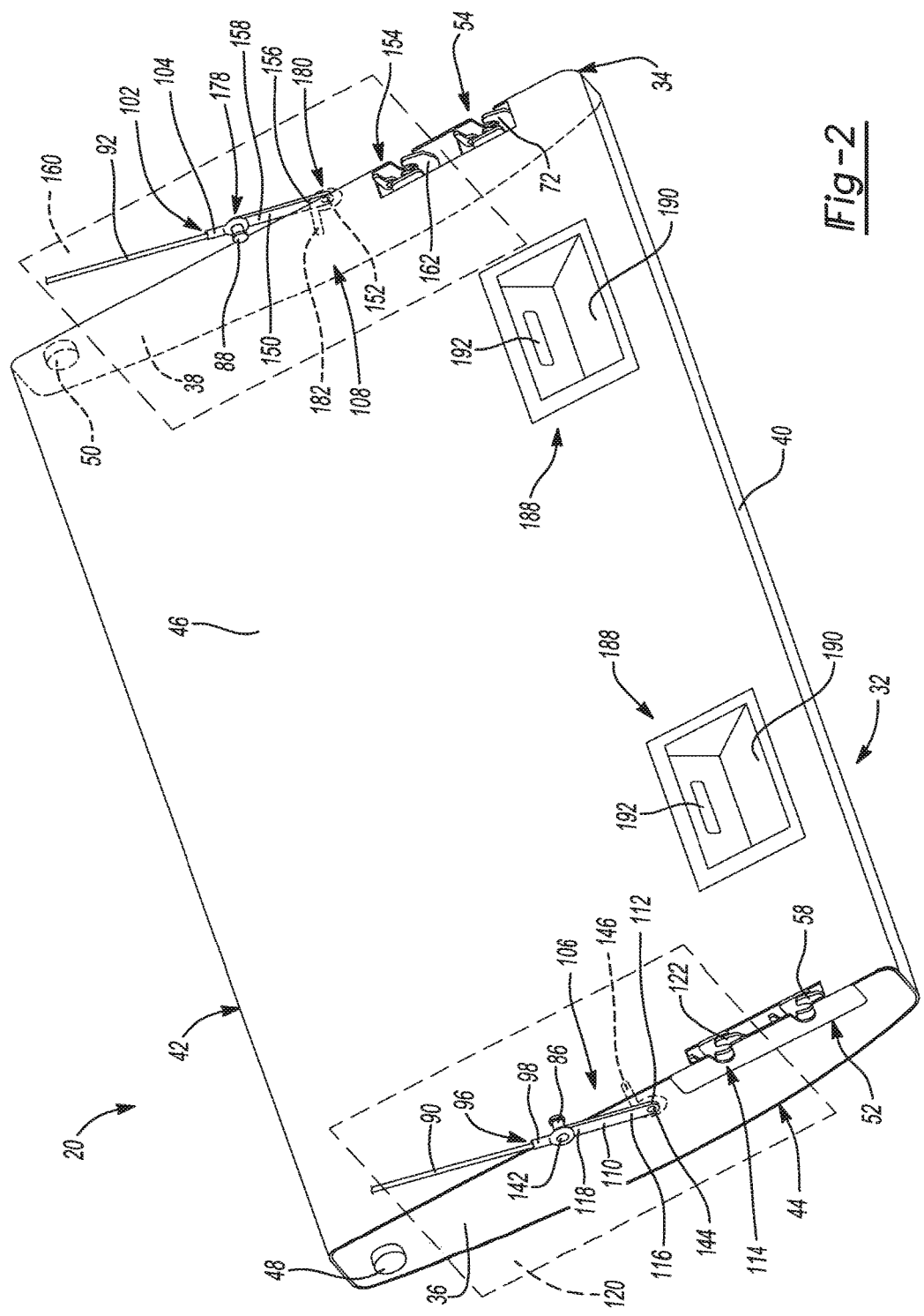
FIG. 2 is an enlarged view of the tailgate of the exemplary tailgate assembly illustrated in FIG. 1.
Figure 3:
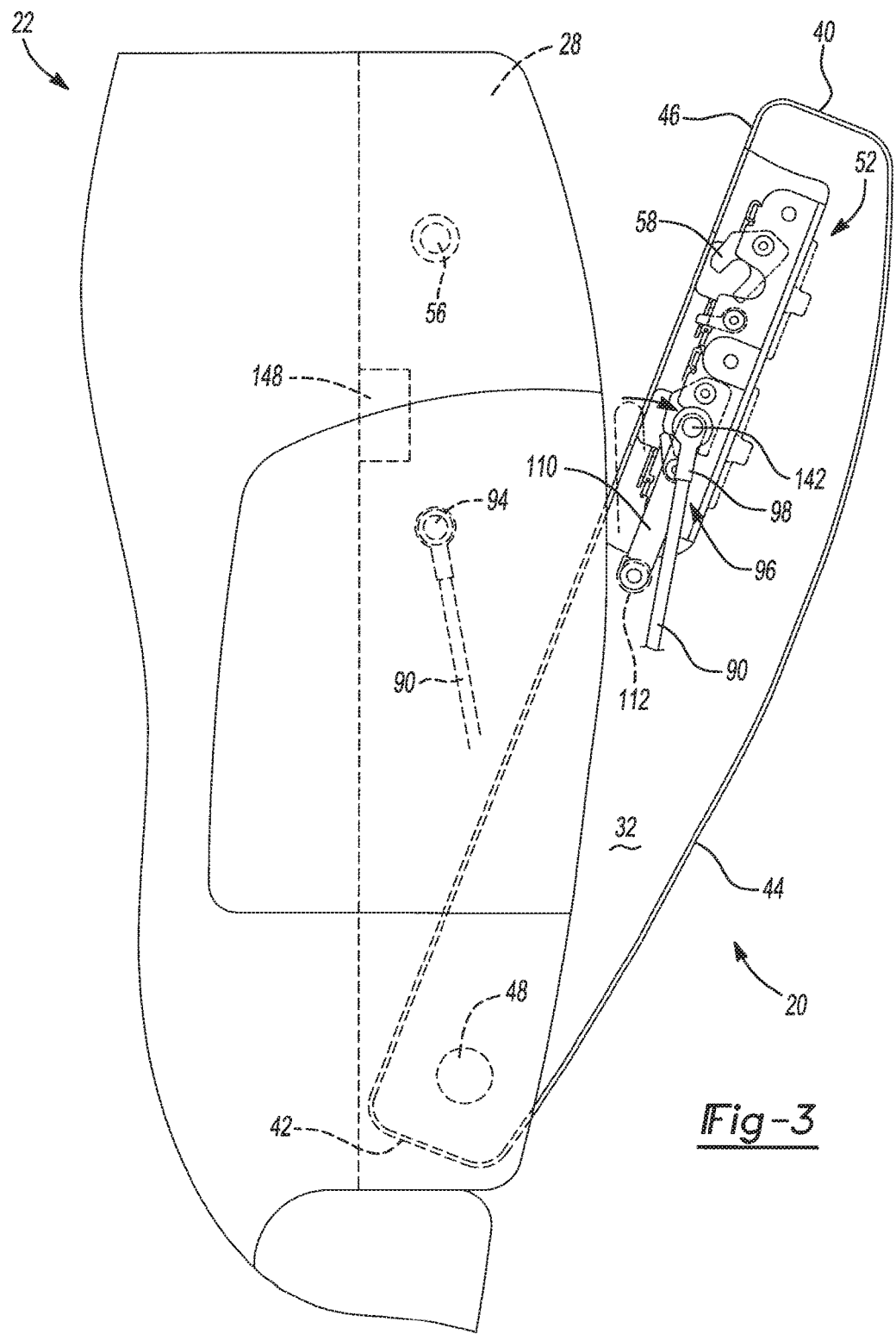
FIG. 3 is a side elevation view of the exemplary tailgate assembly illustrated in FIG. 1 where the tailgate is shown rotated away from a stowed position.
Figure 4:
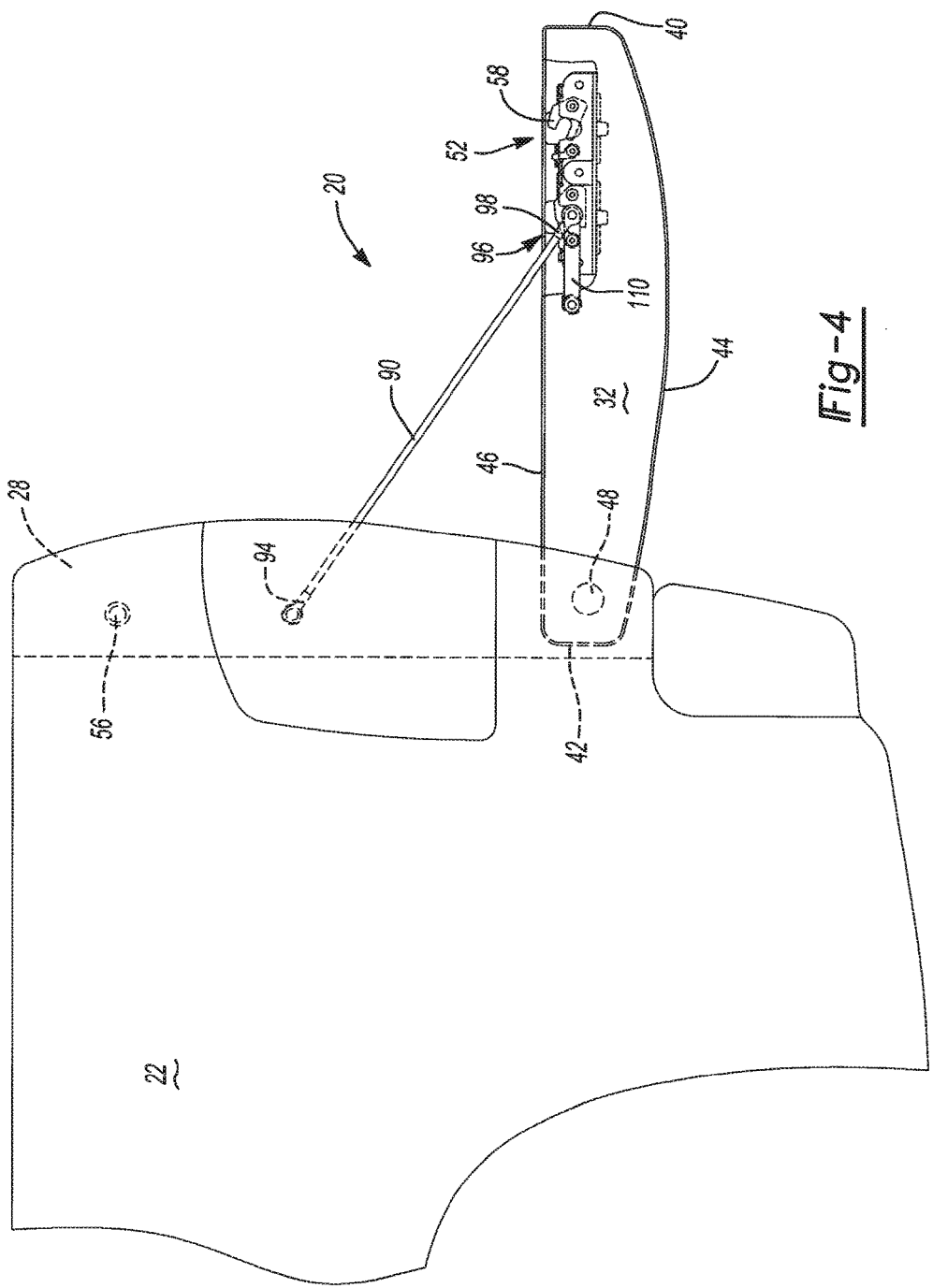
FIG. 4 is a side elevation view of the exemplary tailgate assembly illustrated in FIG. 1 where the tailgate is shown in a first open position.

With reference to FIGS. 1-5, the tailgate assembly 20 of the vehicle 22 includes a tailgate 32 having a perimeter 34 that is defined by a first close face 36, a second close face 38, a top 40, and a bottom 42. The bottom 42 of the tailgate 32 is disposed adjacent the floor 26 of the cargo area 24. The top 40 of the tailgate 32 is arranged opposite of the bottom 42 of the tailgate 32 and the first and second close faces 36, 38 are arranged on opposite sides of the tailgate 32. The tailgate 32 also includes an exterior surface 44 and an interior surface 46 that is arranged opposite the exterior surface 44. A first tailgate pivot 48 is disposed along the first close face 36 of the tailgate 32 adjacent to the bottom 42 of the tailgate 32. Similarly, a second tailgate pivot 50 is disposed along the second close face 38 of the tailgate 32 adjacent to the bottom 42 of the tailgate 32. The tailgate 32 is pivotally supported on the first and second bedsides 28, 30 of the vehicle 22 by the first and second tailgate pivots 48, 50 for movement between a stowed position and a plurality of open positions. In FIGS. 1-5, the tailgate 32 is illustrated in various open positions. In FIGS. 3-5, the dashed lines illustrate the position of the tailgate 32 in the stowed position. It should be appreciated that the first close face 36 of the tailgate 32 closes against the first bedside 28 of the vehicle 22 and the second close face 38 of the tailgate 32 closes is against the second bedside 30 of the vehicle 22 when the tailgate 32 is in the stowed position. It should also be appreciated that in the stowed position, the interior surface 46 of the tailgate 32 faces the cargo area 24, the exterior surface 44 of the tailgate 32 faces rearward, the bottom 42 of the tailgate 32 is pointed down towards the ground, and the top 40 is pointed up towards the sky.

Figure 6A:
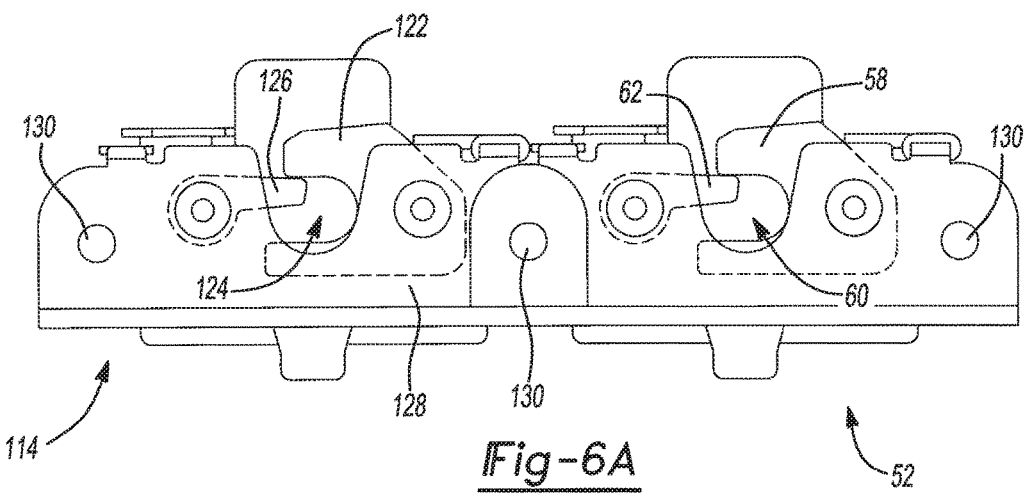
FIG. 6A is a side elevation view of the first tailgate latch assembly and the first swing link latch assembly of the exemplary tailgate assembly illustrated in FIG. 1 where the first tailgate latch assembly and the first swing link latch assembly are shown in an engaged position.
Figure 6B:
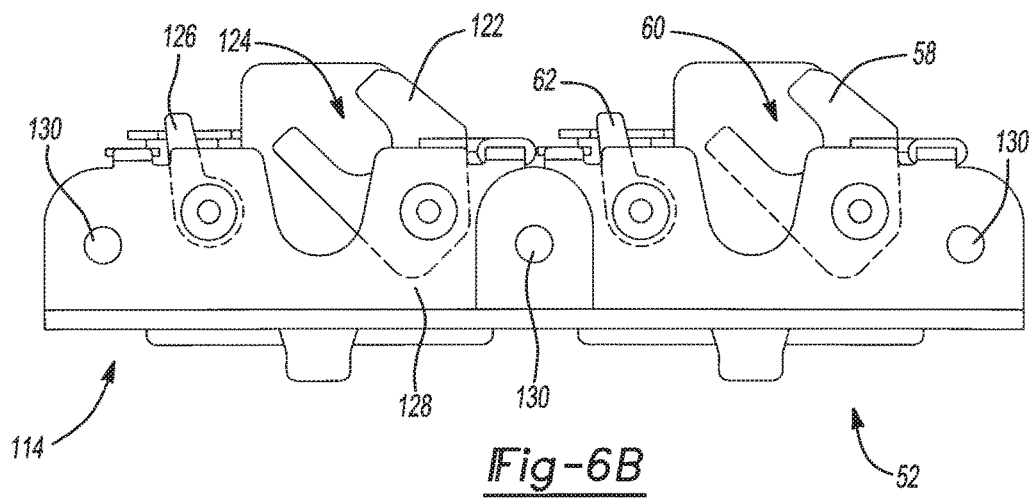
FIG. 6B is a side elevation view of the first tailgate latch assembly and the first swing link latch assembly of the exemplary tailgate assembly illustrated in FIG. 1 where the first tailgate latch assembly and the first swing link latch assembly are shown in a release position.

With additional reference to FIGS. 6A-D and FIGS. 7A-D, the tailgate assembly 20 includes a first tailgate latch assembly 52 and a second tailgate latch assembly 54. The first tailgate latch assembly 52 includes a first tailgate latch striker 56 extending from and fixed to the first bedside 28 of the vehicle 22 and a first tailgate latch jaw 58 that is pivotally mounted to the tailgate 32. The first tailgate latch jaw 58 operably rotates between an engaged position (FIG. 6A) and a release position (FIG. 6B) such that the first tailgate latch jaw 58 releasably engages the first tailgate latch striker 56. As best seen in FIG. 2, the first tailgate latch jaw 58 is disposed along the first close face 36 of the tailgate 32 between the first tailgate pivot 48 and the top 40 of the tailgate 32. The first tailgate latch striker 56 has a cylindrical shape and the first tailgate latch jaw 58 has a first U-shaped tailgate jaw cutout 60 that captures the first tailgate latch striker 56 when the tailgate 32 is rotated to the stowed position. The first tailgate latch assembly 52 includes a first tailgate latch locking arm 62 that is pivotally mounted to the tailgate 32 for rotation between a locked position (FIG. 6A) and an unlocked position (FIG. 6B). As shown in FIG. 6A, in the locked position, the first tailgate latch locking arm 62 extends into the first U-shaped tailgate jaw cutout 60 to prevent the first tailgate latch jaw 58 from rotating from the engaged position. As shown in FIG. 6B, in the unlocked position, the first tailgate latch locking arm 62 rotates out away from the first U-shaped tailgate jaw cutout 60, enabling the first tailgate latch jaw 58 to rotate to the release position and release the first tailgate latch striker 56 to permit rotation of the tailgate 32 to a first open position (shown in FIG. 4). In the first open position, the tailgate 32 may be rotated approximately 90 degrees away from the stowed position. Accordingly, when the vehicle 22 is on level ground and the tailgate 32 is rotated to the first open position, the interior surface 46 of the tailgate 32 may be horizontal.

Figure 7A:
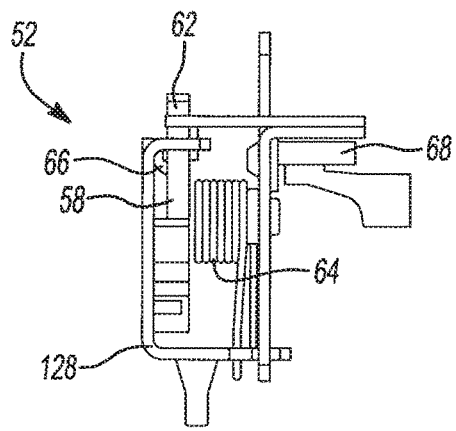
FIG. 7A is a front elevation view of the first tailgate latch assembly of the exemplary tailgate assembly illustrated in FIG. 1.

As shown in FIG. 7A, the first tailgate latch assembly 52 includes a first tailgate latch jaw torsion spring 64 that biases the first tailgate latch jaw 58 to the engaged position (FIG. 6A). A first tailgate latch locking arm torsion spring 66 biases the first tailgate latch locking arm 62 to the locked position (FIG. 6A). A first tailgate latch release cable 68 is connected to at least one of the first tailgate latch jaw 58 and the first tailgate latch locking arm 62 to operably rotate the first tailgate latch jaw 58 and the first tailgate latch locking arm 62 to the unlocked position (FIG. 6B). It should be appreciated that the first tailgate latch jaw 58 and the first tailgate latch locking arm 62 may be rotatably coupled to one another through contact with one another or through a separate mechanism (e.g. cam or gear) such that rotation of one drives rotation of the other.

Figure 6C:
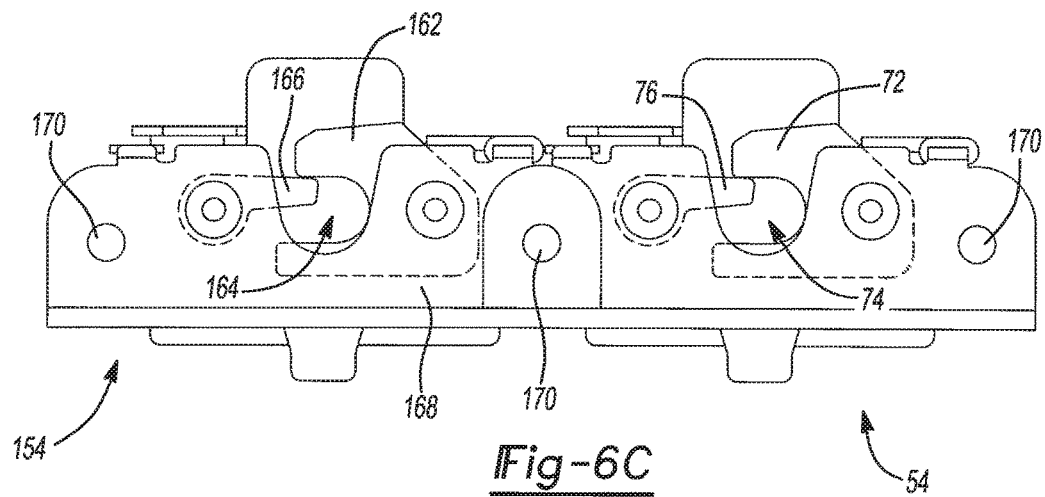
FIG. 6C is a side elevation view of the second tailgate latch assembly and the second swing link latch assembly of the exemplary tailgate assembly illustrated in FIG. 1 where the second tailgate latch assembly and the second swing link latch assembly are shown in an engaged position.
Figure 6D:
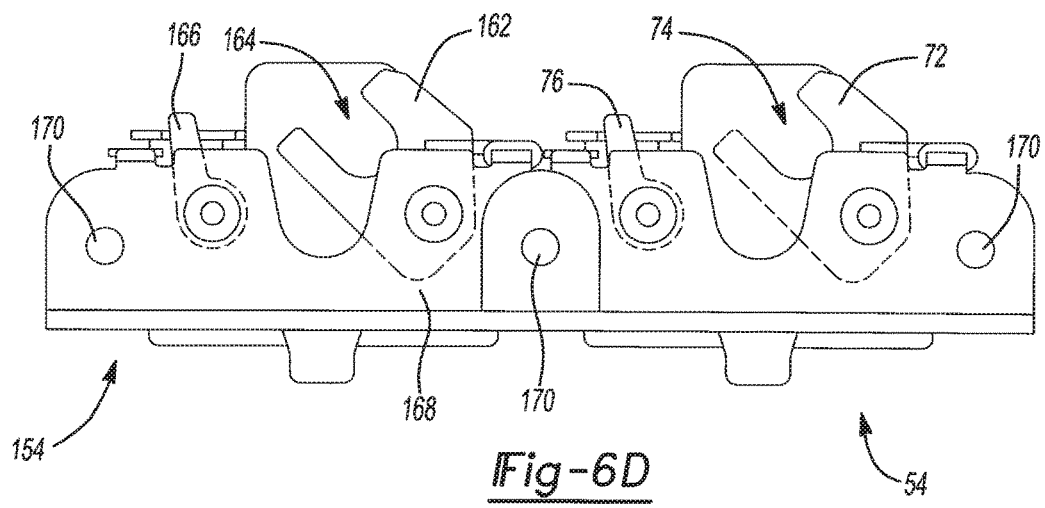
FIG. 6D is a side elevation view of the second tailgate latch assembly and the second swing link latch assembly of the exemplary tailgate assembly illustrated in FIG. 1 where the second tailgate latch assembly and the second swing link latch assembly are shown in a release position.

The second tailgate latch assembly 54 includes a second tailgate latch striker 70 extending from and fixed to the second bedside 30 of the vehicle 22 and a second tailgate latch jaw 72 that is pivotally mounted to the tailgate 32. The second tailgate latch jaw 72 operably rotates between an engaged position (FIG. 6C) and a release position (FIG. 6D) such that the second tailgate latch jaw 72 releasably engages the second tailgate latch striker 70. As best seen in FIG. 2, the second tailgate latch jaw 72 is disposed along the second close face 38 of the tailgate 32 between the second tailgate pivot 50 and the top 40 of the tailgate 32. The second tailgate latch striker 70 has a cylindrical shape and the second tailgate latch jaw 72 has a second U-shaped tailgate jaw cutout 74 that captures the second tailgate latch striker 70 when the tailgate 32 is rotated to the stowed position. The second tailgate latch assembly 54 includes a second tailgate latch locking arm 76 that is pivotally mounted to the tailgate 32 for rotation between a locked position (FIG. 6C) and an unlocked position (FIG. 6D). As shown in FIG. 6C, in the locked position, the second tailgate latch locking arm 76 extends into the second U-shaped tailgate jaw cutout 74 to prevent the second tailgate latch jaw 72 from rotating from the engaged position. As shown in FIG. 6D, in the unlocked position, the second tailgate latch locking arm 76 rotates out away from the second U-shaped tailgate jaw cutout 74, enabling the second tailgate latch jaw 72 to rotate to the release position and release the second tailgate latch striker 70 to permit rotation of the tailgate 32 to the first open position.

Figure 7B:
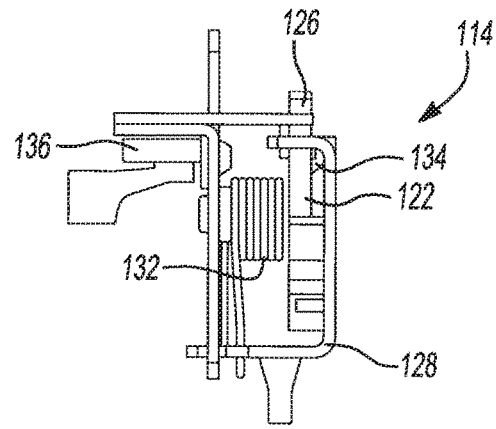
FIG. 7B is a front elevation view of the first swing link latch assembly of the exemplary tailgate assembly illustrated in FIG. 1.
Figure 7C:
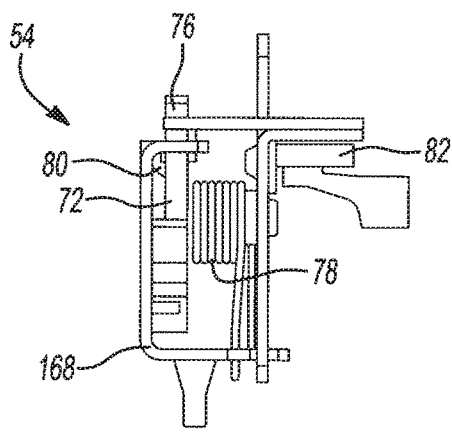
FIG. 7C is a front elevation view of the second tailgate latch assembly of the exemplary tailgate assembly illustrated in FIG. 1.

As shown in FIG. 7C, the second tailgate latch assembly 54 includes a second tailgate latch jaw torsion spring 78 that biases the second tailgate latch jaw 72 to the engaged position (FIG. 6C). A second tailgate latch locking arm torsion spring 80 biases the second tailgate latch locking arm 76 to the locked position (FIG. 6C). A second tailgate latch release cable 82 is connected to at least one of the second tailgate latch jaw 72 and the second tailgate latch locking arm 76 to operably rotate the second tailgate latch jaw 72 and the second tailgate latch locking arm 76 to the unlocked position (FIG. 6D). It should be appreciated that the second tailgate latch jaw 72 and the second tailgate latch locking arm 76 may be rotatably coupled to one another through contact with one another or through a separate mechanism (e.g. cam or gear) such that rotation of one drives rotation of the other.

Figure 8:
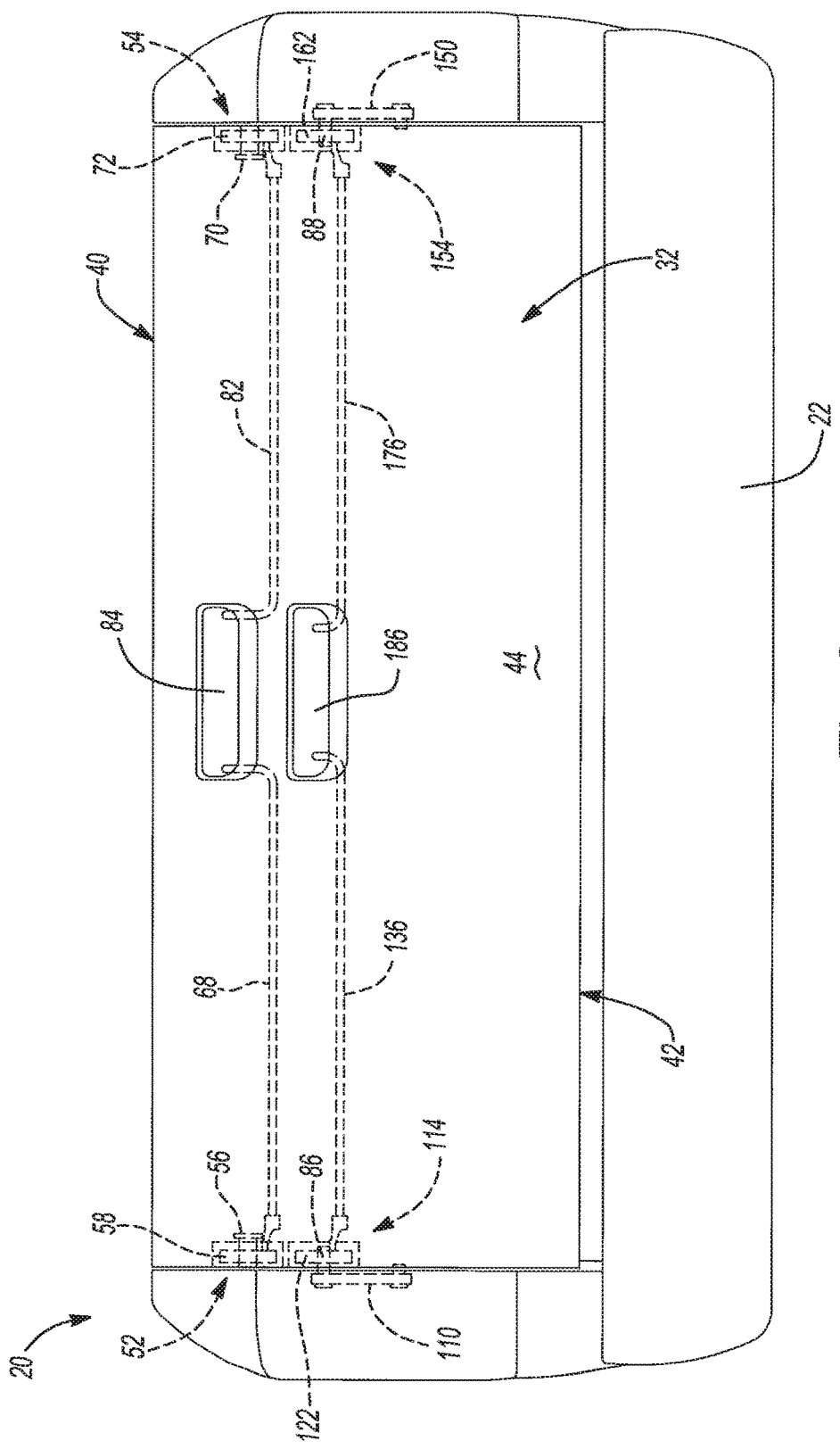
FIG. 8 is a rear elevation view of the exemplary tailgate assembly illustrated in FIG. 1 where the tailgate is shown in the stowed position.

With reference to FIG. 8, the tailgate assembly 20 further includes a tailgate release handle 84 that is pivotally connected to the tailgate 32. The tailgate release handle 84 is connected to the first and second tailgate latch release cables 68, 82 such that movement of the tailgate release handle 84 relative to the tailgate 32 operably causes the first and second tailgate latch locking arms 62, 76 to rotate to the unlocked position and the first and second tailgate latch jaws 58, 72 to rotate to the release position (FIGS. 6B and 6D).

This causes the first and second tailgate latch jaws 58, 72 to release the first and second tailgate latch strikers 56, 70 allowing the tailgate 32 to pivot to the first open position. In the illustrated example, the first and second tailgate latch release cables 68, 82 are push-pull cables; however, it should be appreciated that other types of release cables may be used. Although other arrangements are possible, the tailgate release handle 84 illustrated in FIG. 8 is disposed on the exterior surface 44 of the tailgate 32.

As shown in FIGS. 1-5, the tailgate assembly 20 further includes a first support cable 90 and a second support cable 92. The first support cable 90 extends between a first support cable bedside end 94 that is attached to the first bedside 28 of the vehicle 22 and a first support cable tailgate end 96 opposite the first support cable bedside end 94. The first support cable tailgate end 96 includes a first cable coupler 98. The second support cable 92 extends between a second support cable bedside end 100 that is attached to the second bedside 30 of the vehicle 22 and a second support cable tailgate end 102 that is opposite the second support cable bedside end 100. The second support cable tailgate end 102 includes a second cable coupler 104. As will be explained in greater detail below, the first and second support cables 90, 92 support the tailgate 32 and prevent the tailgate 32 from continuing to rotate beyond a predetermined position.

Still referring to FIGS. 1-5, the tailgate assembly 20 further includes a first swing link assembly 106 and a second swing link assembly 108. The first swing link assembly 106 includes a first swing link 110, a first swing link pivot 112, and a first swing link latch assembly 114. The first swing link 110 extends between a first swing link proximal end 116 and a first swing link distal end 118. The first swing link pivot 112 is disposed along the first close face 36 of the tailgate 32 between the first tailgate latch jaw 58 and the first tailgate pivot 48. The first swing link pivot 112 pivotally connects the first swing link proximal end 116 to the first close face 36 of the tailgate 32. The first swing link pivot 112 allows the first swing link 110 to rotate in a first swing link rotation plane 120 between a stored position (FIGS. 3 and 4) and a deployed position (FIG. 5). The first swing link rotation plane 120 extends parallel to the first close face 36 of the tailgate 32 such that the first swing link 110 is disposed between the first close face 36 of the tailgate 32 and the first bedside 28 of the vehicle 22 when the tailgate 32 is in the stowed position.

The first swing link latch assembly 114 includes a first swing link latch striker 86 and a first swing link latch jaw 122. The first swing link latch striker 86 extends from the first swing link distal end 118 in a first inward direction pointing towards the second close face 38 of the tailgate 32. The first swing link latch jaw 122 is pivotally mounted to the tailgate 32 for rotation between an engaged position (FIG. 6A) and a release position (FIG. 6B) such that the first swing link latch jaw 122 releasably engages the first swing link latch striker 86. As best seen in FIG. 2, the first swing link latch jaw 122 is disposed along the first close face 36 of the tailgate 32 between the first tailgate latch jaw 58 and the first swing link pivot 112. The first swing link latch striker 86 has a cylindrical shape and the first swing link latch jaw 122 includes a first U-shaped swing link jaw cutout 124 that captures the first swing link latch striker 86 when the first swing link 110 is in the stored position (FIGS. 3 and 4).

The first swing link latch assembly 114 also includes a first swing link latch locking arm 126 that is pivotally mounted to the tailgate 32 for rotation between a locked position (FIG. 6A) and an unlocked position (FIG. 6B). As shown in FIG. 6A, in the locked position, the first swing link latch locking arm 126 extends into the first U-shaped swing link jaw cutout 124 to prevent the first swing link latch jaw 122 from rotating from the engaged position. As shown in FIG. 6B, in the unlocked position, the first swing link latch locking arm 126 rotates out away from the first U-shaped swing link jaw cutout 124, enabling the first swing link latch jaw 122 to rotate to the release position. In the release position, the first swing link latch jaw 122 releases the first swing link latch striker 86 and permits further rotation of the tailgate 32 from the first open position (FIG. 4) to a second open position (FIGS. 1, 2, and 5). In the second open position, the tailgate 32 is rotated further away from the stowed position than it is when the tailgate 32 is in the first open position (i.e. in the second open position, the tailgate 32 is dropped below the first open position) such that the top 40 of the tailgate 32 is below the bottom 42 of the tailgate 32 (i.e. the top 40 of the tailgate 32 is closer to the ground than the bottom 42 of the tailgate 32). The angular displacement of the tailgate 32 in the second open position may vary depending upon several design considerations such as the length of the tailgate 32 and the height of the first and second tailgate pivots 48, 50 relative to the ground. In one embodiment, the top 40 of the tailgate 32 drops approximately 13 to 15 inches when the tailgate 32 is rotated from the first open position to the second open position. In the example shown, the tailgate 32 may be rotated approximately 135 degrees away from the stowed position (i.e. 45 degrees away from the first open position) when the tailgate 32 is in the second open position. As shown in FIGS. 6A-B and FIGS. 7A-B, the tailgate assembly 20 may include a common first latch body 128 that supports both the first tailgate latch jaw 58 and the first swing link latch jaw 122. The common first latch body 128 is connected to the first close face 36 of the tailgate 32 by one or more first latch body fasteners 130.

With reference to FIG. 7B, the first swing link latch assembly 114 includes a first swing link latch jaw torsion spring 132 that biases the first swing link latch jaw 122 to the engaged position (FIG. 6A). A first swing link latch locking arm torsion spring 134 biases the first swing link latch locking arm 126 to the locked position (FIG. 6A). A first swing link release cable 136 is connected to at least one of the first swing link latch jaw 122 and the first swing link latch locking arm 126 to operably rotate the first swing link latch jaw 122 and the first swing link latch locking arm 126 to the unlocked position (FIG. 6B). It should be appreciated that the first swing link latch jaw 122 and the first swing link latch locking arm 126 may be rotatably coupled to one another through contact with one another or through a separate mechanism (e.g. a cam or gear) such that rotation of one drives rotation of the other.

With reference to FIGS. 1-5, the first swing link distal end 118 is connected to the first support cable 90 by the first cable coupler 98 such that the tailgate 32 is limited to rotation between the stowed position and the first open position when the first swing link 110 is in the stored position (FIG. 4), while further rotation of the tailgate 32 from the first open position to the second open position is permitted when the first swing link 110 is in the deployed position (FIG. 5). It should be appreciated that the first support cable 90 is taut in both the first and second open positions (FIGS. 4 and 5) where the first support cable 90 bears at least part of the weight of the tailgate 32. It should also be appreciated that the first swing link 110 is aligned with the first support cable 90 when the tailgate 32 is in the second open position (FIG. 5). The first support cable 90 may be cut to a predetermined cable length 138 that allows the tailgate 32 to rotate approximately 90 degrees between the stowed position (FIG. 3) and the first open position (FIG. 4). Similarly, the first swing link 110 may have a predetermined swing link length 140 that allows the tailgate 32 to rotate approximately 45 degrees between the first open position (FIG. 4) and the second open position (FIG. 5). It should be appreciated that the term "approximately" as used herein with respect to angular displacement means plus or minus 5 degrees (i.e. rotation of the tailgate 32 from the stowed position to the first open position may range from 85 to 95 degrees and rotation of the tailgate 32 from the first open position to the second open position may range from 40 to 50 degrees). While other lengths may be used, the predetermined cable length 138 may range from 20 to 23 inches as measured between the first support cable bedside end 94 to the first support cable tailgate end 96 and the predetermined swing link length 140 may range from 3 to 5 inches as measured from the first cable coupler 98 to the first swing link pivot 112.

It should be appreciated that the first swing link 110 may be connected to the tailgate 32 and the first support cable tailgate end 96 in a number of different ways. In the illustrated example, the first swing link assembly 106 includes a first cable fastener 142 that extends through the first cable coupler 98, the first swing link distal end 118, and the first swing link latch striker 86 to connect the first support cable 90 and the first swing link latch striker 86 to the first swing link distal end 118. The first swing link assembly 106 may also include a first swing link shoulder fastener 144 that extends through the first swing link proximal end 116 and the first swing link pivot 112 and into the first close face 36 of the tailgate 32 to pivotally connect the first swing link pivot 112 to the first close face 36 of the tailgate 32 at a position located between the first swing link latch jaw 122 and the first tailgate pivot 48.

To ensure return of the first swing link 110 to the stored position when the tailgate 32 is rotated back to the stowed position (FIG. 3), the first swing link assembly 106 may include a first swing link biasing member 146 that is connected between the first swing link 110 and the first close face 36 of the tailgate 32. The first swing link biasing member 146 operably biases the first swing link 110 towards the stored position where the first swing link latch jaw 122 is engaged with the first swing link latch striker 86. Although various constructions are possible, in the illustrated example, the first swing link biasing member 146 is a torsion spring. In addition to the first swing link biasing member 146, or as an alternative to the first swing link biasing member 146, the tailgate assembly 20 may include a first re-latch bumper 148 that is positioned on the first bedside 28 of the vehicle 22 to contact the first swing link distal end 118 and return the first swing link 110 to the stored position when the tailgate 32 is rotated to the stowed position (FIG. 3).

As shown in FIGS. 1-5, the second swing link assembly 108 includes a second swing link 150, a second swing link pivot 152, and a second swing link latch assembly 154. The second swing link 150 extends between a second swing link proximal end 156 and a second swing link distal end 158. The second swing link pivot 152 is disposed along the second close face 38 of the tailgate 32 between the second tailgate latch jaw 72 and the second tailgate pivot 50. The second swing link pivot 152 pivotally connects the second swing link proximal end 156 to the second close face 38 of the tailgate 32. The second swing link pivot 152 allows the second swing link 150 to rotate in a second swing link rotation plane 160 between a stored position and a deployed position. The second swing link rotation plane 160 extends parallel to the second close face 38 of the tailgate 32 such that the second swing link 150 is disposed between the second close face 38 of the tailgate 32 and the second bedside 30 of the vehicle 22 when the tailgate 32 is in the stowed position.

The second swing link latch assembly 154 includes a second swing link latch striker 88 and a second swing link latch jaw 162. The second swing link latch striker 88 extends from the second swing link distal end 158 in a second inward direction pointing towards the first close face 36 of the tailgate 32. The second swing link latch jaw 162 is pivotally mounted to the tailgate 32 for rotation between an engaged position (FIG. 6C) and a release position (FIG. 6D) such that the second swing link latch jaw 162 releasably engages the second swing link latch striker 88. As best seen in FIG. 2, the second swing link latch jaw 162 is disposed along the second close face 38 of the tailgate 32 between the second tailgate latch jaw 72 and the second swing link pivot 152. The second swing link latch striker 88 has a cylindrical shape and the second swing link latch jaw 162 includes a second U-shaped swing link jaw cutout 164 that captures the second swing link latch striker 88 when the second swing link 150 is in the stored position.

The second swing link latch assembly 154 also includes a second swing link latch locking arm 166 that is pivotally mounted to the tailgate 32 for rotation between a locked position (FIG. 6C) and an unlocked position (FIG. 6D). As shown in FIG. 6C, in the locked position, the second swing link latch locking arm 166 extends into the second U-shaped swing link jaw cutout 164 to prevent the second swing link latch jaw 162 from rotating from the engaged position. As shown in FIG. 6D, in the unlocked position, the second swing link latch locking arm 166 rotates out away from the second U-shaped swing link jaw cutout 164, enabling the second swing link latch jaw 162 to rotate to the release position. In the release position, the second swing link latch jaw 162 releases the second swing link latch striker 88 and permits further rotation of the tailgate 32 from the first open position (FIG. 4) to a second open position (FIGS. 1, 2, and 5). As shown in FIGS. 6C-D and FIGS. 7C-D, the tailgate assembly 20 may include a common second latch body 168 that supports both the second tailgate latch jaw 72 and the second swing link latch jaw 162. The common second latch body 168 is connected to the second close face 38 of the tailgate 32 by one or more second latch body fasteners 170.

Figure 7D:
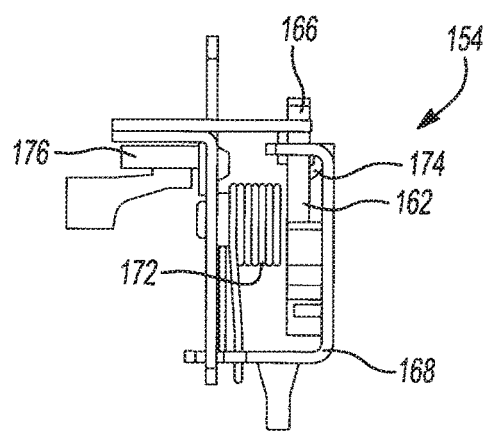
FIG. 7D is a front elevation view of the second swing link latch assembly of the exemplary tailgate assembly illustrated in FIG. 1.

With reference to FIG. 7D, the second swing link latch assembly 154 includes a second swing link latch jaw torsion spring 172 that biases the second swing link latch jaw 162 to the engaged position (FIG. 6C). A second swing link latch locking arm torsion spring 174 biases the second swing link latch locking arm 166 to the locked position (FIG. 6C). A second swing link release cable 176 is connected to at least one of the second swing link latch jaw 162 and the second swing link latch locking arm 166 to operably rotate the second swing link latch jaw 162 and the second swing link latch locking arm 166 to the unlocked position (FIG. 6D). It should be appreciated that the second swing link latch jaw 162 and the second swing link latch locking arm 166 may be rotatably coupled to one another through contact with one another or through a separate mechanism (e.g. a cam or gear) such that rotation of one drives rotation of the other.

With reference to FIGS. 1-5, the second swing link distal end 158 is connected to the second support cable 92 by the second cable coupler 104 such that the tailgate 32 is limited to rotation between the stowed position and the first open position when the second swing link 150 is in the stored position, while further rotation of the tailgate 32 from the first open position to the second open position is permitted when the second swing link 150 is in the deployed position. It should be appreciated that the second support cable 92 is taut in both the first and second open positions (FIGS. 4 and 5) where the second support cable 92 bears at least part of the weight of the tailgate 32. It should also be appreciated that the second swing link 150 is aligned with the second support cable 92 when the tailgate 32 is in the second open position (FIG. 5). The second support cable 92 may be cut to the predetermined cable length 138 described above to allow the tailgate 32 to rotate approximately 90 degrees between the stowed position (FIG. 3) and the first open position (FIG. 4). Similarly, the second swing link 150 may have the predetermined swing link length 140 described above to allow the tailgate 32 to rotate approximately 45 degrees between the first open position (FIG. 4) and the second open position (FIG. 5).

It should be appreciated that the second swing link 150 may be connected to the tailgate 32 and the second support cable tailgate end 102 in a number of different ways. In the illustrated example, the second swing link assembly 108 includes a second cable fastener 178 that extends through the second cable coupler 104, the second swing link distal end 158, and the second swing link latch striker 88 to connect the second support cable 92 and the second swing link latch striker 88 to the second swing link distal end 158. The second swing link assembly 108 may also include a second swing link shoulder fastener 180 that extends through the second swing link proximal end 156 and the second swing link pivot 152 and into the second close face 38 of the tailgate 32 to pivotally connect the second swing link pivot 152 to the second close face 38 of the tailgate 32 at a position located between the second swing link latch jaw 162 and the second tailgate pivot 50.

To ensure return of the second swing link 150 to the stored position when the tailgate 32 is rotated back to the stowed position, the second swing link assembly 108 may include a second swing link biasing member 182 that is connected between the second swing link 150 and the second close face 38 of the tailgate 32. The second swing link biasing member 182 operably biases the second swing link 150 towards the stored position where the second swing link latch jaw 162 is engaged with the second swing link latch striker 88. Although various constructions are possible, in the illustrated example, the second swing link biasing member 182 is a torsion spring. In addition to the second swing link biasing member 182, or as an alternative to the second swing link biasing member 182, the tailgate assembly 20 may include a second re-latch bumper 184 that is positioned on the second bedside 30 of the vehicle 22 to contact the second swing link distal end 158 and return the second swing link 150 to the stored position when the tailgate 32 is rotated to the stowed position (FIG. 3).

With reference to FIG. 8, the tailgate assembly 20 includes a swing link release handle 186 that is pivotally connected to the tailgate 32. The swing link release handle 186 is connected to the first and second swing link release cables 136, 176 such that movement of the swing link release handle 186 relative to the tailgate 32 operably causes the first and second swing link latch locking arms 126, 166 to rotate to the unlocked position and the first and second swing link latch jaws 122, 162 to rotate to the release position (FIGS. 6B and 6D). When this happens, the first and second swing link latch jaws 122, 162 release the first and second swing link latch strikers 86, 88 allowing the tailgate 32 to pivot from the first open position (FIG. 4) to the second open position (FIG. 5). In the illustrated example, the first and second swing link release cables 136, 176 are push-pull cables; however, it should be appreciated that other types of release cables may be used. As illustrated, the swing link release handle 186 may be separate from the tailgate release handle 84 and may be disposed on the exterior surface 44 of the tailgate 32. In other embodiments, the swing link release handle 186 may be positioned on the interior surface 46 or top 40 of the tailgate 32, the swing link release handle 186 may be positioned on one of the first or second besides of the vehicle 22 or on both of the first and second bedsides 28, 30 of the vehicle 22, the swing link release handle 186 and the tailgate release handle 84 may be positioned directly adjacent to one another to form separate parts of a common handle (i.e. a split handle), or the swing link release handle 186 and the tailgate release handle 84 may be combined into one handle that has two stages of opening where rotation of the handle to a first position causes the first and second tailgate latch assemblies 52, 54 to release and rotation of the handle to a second position causes the first and second swing link latch assemblies 114, 154 to release.

As shown in FIGS. 1 and 2, the tailgate 32 has one or more steps 188 disposed along the interior surface 46 of the tailgate 32. The steps 188 may be provided in the form of recesses that extend into the tailgate 32 from the interior surface 46 towards the exterior surface 44. Optionally, each one of the steps 188 may include a nonskid surface 190 and a light 192 positioned to illuminate the recess. It should be appreciated that the steps 188 allow individuals to more easily climb into or step down from the cargo area 24 of the vehicle 22 when the tailgate 32 is rotated to the second open position. Advantageously, this provides improved access into and out of the cargo area 24.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "the" in the apparatus claims refers to an antecedent that is a positive recitation meant to be included in the coverage of the claims whereas the word "the" precedes a word not meant to be included in the coverage of the claims.

What is claimed is:

1. A tailgate assembly for a vehicle having a cargo area disposed between a first bedside and a second bedside, said tailgate assembly comprising:
   a tailgate having an exterior surface, an interior surface, and a perimeter defined by a first close face, a second close face, a top, and a bottom, said tailgate configured to be pivotally supported on the first and second besides of the vehicle for movement between a stowed position and a plurality of open positions;
   at least one tailgate latch assembly releasably retaining said tailgate in said stowed position;
   a first support cable extending between a first support cable bedside end and a first support cable tailgate end, said first support cable bedside end configured to be attached to the first bedside of the vehicle;
   a first swing link assembly including a first swing link extending between a first swing link proximal end and a first swing link distal end, a first swing link pivot pivotally connecting said first swing link proximal end to said first close face of said tailgate to permit rotation of said first swing link between a stored position and a deployed position, and a first swing link latch assembly releasably retaining said first swing link in said stored position;

said first support cable tailgate end connected to said first swing link distal end such that said tailgate is limited to rotation between said stowed position and a first open position when said first swing link is in said stored position and further rotation of said tailgate between said first open position and a second open position is permitted when said first swing link is in said deployed position; and at least one step disposed along said interior surface of said tailgate that provides access to said cargo area when said tailgate is in said second open position, wherein said first swing link latch assembly includes a first swing link latch striker extending from said first swing link distal end in a first inward direction pointing towards said second close face of said tailgate and a first swing link latch jaw that is disposed along said first close face of said tailgate between said top of said tailgate and said first swing link pivot, said first swing link latch jaw being pivotally mounted to said tailgate for rotation between an engaged position where said first swing link latch jaw captures said first swing link latch striker when said first swing link is in said stored position and a release position where said first swing link latch law releases said first swing link latch striker to permit rotation of said first swing link to said deployed position and rotation of said tailgate from said first open position to said second open position.

2. The tailgate assembly as set forth in claim 1, wherein said first close face of said tailgate is configured to close against the first bedside of the vehicle and said second close face of said tailgate is configured to close against the second bedside of the vehicle when said tailgate is in said stowed position.

3. The tailgate assembly as set forth in claim 1, wherein said at least one step is a recess that extends into said tailgate from said interior surface towards said exterior surface.

4. The tailgate assembly as set forth in claim 2, wherein said first swing link pivot is disposed along said first close face of said tailgate such that said first swing link is positioned between said first close face of said tailgate and said first bedside of the vehicle when said tailgate is in said stowed position.

5. The tailgate assembly as set forth in claim 4, wherein said first swing link rotates between said stored position and said deployed position in a first swing link plane that is disposed between said first close face of said tailgate and the first bedside of the vehicle.

6. A tailgate assembly for a vehicle having a cargo area disposed between a first bedside and a second bedside, said tailgate assembly comprising:

a tailgate having an exterior surface, an interior surface, and a perimeter defined by a first close face, a second close face, a top, and a bottom, said tailgate configured to be pivotally supported on the first besides of the vehicle for movement between a stowed position and a plurality of open positions;

at least one tailgate latch assembly releasably retaining said tailgate in said stowed position;

a first support cable extending between a first support cable bedside end and a first support cable tailgate end, said first support cable bedside end configured to be attached to the first bedside of the vehicle;

a second support cable extending between a second support cable bedside end and a second support cable tailgate end, said second support cable bedside end configured to be attached to the second bedside of the vehicle;

a first swing link assembly including a first swing link extending between a first swing link proximal end and a first swing link distal end, a first swing link pivot pivotally connecting said first swing link proximal end to said first close face of said tailgate to permit rotation of said first swing link between a stored position and a deployed position, and a first swing link latch assembly releasably retaining said first swing link in said stored position;

a second swing link assembly including a second swing link extending between a second swing link proximal end and a second swing link distal end, a second swing link pivot pivotally connecting said second swing link proximal end to said second close face of said tailgate to permit rotation of said second swing link between a stored position and a deployed position, and a second swing link latch assembly releasably retaining said second swing link in said stored position;

said first support cable tailgate end connected to said first swing link distal end and said second support cable tailgate end connected to said second swing link distal end such that said tailgate is limited to rotation between said stowed position and a first open position when said first swing links are in said stored position and further rotation of said tailgate between said first open position and a second open position is permitted when said first swing links are in said deployed position; and at least one step disposed along said interior surface of said tailgate that provides access to said cargo area when said tailgate is in said second open position, wherein said first swing link latch assembly includes a first swing link latch striker extending from said first swing link distal end in a first inward direction pointing towards said second close face of said tailgate, a first swing link latch jaw that is pivotally mounted to said tailgate for rotation between an engaged position and a release position, said first swing link latch jaw disposed along said first close face of said tailgate between said top of said tailgate and said first swing link pivot, said first swing link latch jaw including a first U-shaped swing link jaw cutout that captures said first swing link latch striker when said first swing link is in said stored position, and a first swing link latch locking arm that is pivotally mounted to said tailgate for rotation between a locked position where said first swing link latch locking arm extends into said first U-shaped swing link jaw cutout to prevent said first swing link latch jaw from rotating and an unlocked position where said first swing link latch locking arm rotates out away from said first U-shaped swing link jaw cutout, enabling said first swing link latch jaw to rotate to said release position and release said first swing link latch striker to permit further rotation of said tailgate from said first open position to said second open position.

7. The tailgate assembly as set forth in claim 6, wherein said second swing link latch assembly includes a second swing link latch striker extending from said second swing link distal end in a second inward direction pointing towards said first close face of said tailgate, a second swing link latch jaw that is pivotally mounted to said tailgate for rotation between an engaged position and a release position, said second swing link latch jaw disposed along said second close face of said tailgate between said top of said tailgate and said second swing link pivot, said second swing link latch jaw including a second U-shaped swing link jaw cutout that captures said second swing link latch striker when said second swing link is in said stored position, and a second swing link latch locking arm that is pivotally mounted to said tailgate for rotation between a locked position where said second swing link latch locking arm extends into said second U-shaped swing link jaw cutout to prevent said second swing link latch jaw from rotating and an unlocked position where said second swing link latch locking arm rotates out away from said second U-shaped swing link jaw cutout, enabling said second swing link latch jaw to rotate to said release position and release said second swing link latch striker to permit further rotation of said tailgate from said first open position to said second open position.

8. The tailgate assembly as set forth in claim 7, further comprising:
- a swing link release handle pivotally connected to said tailgate, said swing link release handle connected to said first swing link latch locking arm by a first swing link release cable and to said second swing link latch locking arm by a second swing link release cable such that movement of said swing link release handle relative to said tailgate operably causes said first swing link release cables to rotate said first swing link latch locking arms to said unlocked position.

9. The tailgate assembly as set forth in claim 8 wherein said interior surface of said tailgate faces the cargo area of the vehicle when said tailgate is in said stowed position, said exterior surface of said tailgate is opposite said interior surface, and said swing link release handle is disposed on said exterior surface of said tailgate.

10. The tailgate assembly as set forth in claim 7 wherein said at least one tailgate latch assembly includes a first tailgate latch assembly having a first tailgate latch jaw disposed along said first close face of said tailgate between said first swing link latch jaw and said top of said tailgate and a second tailgate latch assembly having a second tailgate latch jaw disposed along said second close face of said tailgate between said second swing link latch jaw and said top of said tailgate, wherein a common first latch body connected to said first close face of said tailgate houses and supports said first tailgate latch jaw and said first swing link latch jaw, and wherein a common second latch body connected to said second close face of said tailgate houses and supports said second tailgate latch jaw and said second swing link latch jaw.

11. The tailgate assembly as set forth in claim 6, wherein said first support cables have a predetermined cable length that allows said tailgate to rotate approximately 90 degrees between said stowed position and said first open position.

12. The tailgate assembly as set forth in claim 11, wherein said first swing links are aligned with said first support cables when said tailgate is in said second open position and wherein said first swing links have a predetermined swing link length that allows said tailgate to rotate approximately 45 degrees between said first open position and said second open position.

13. The tailgate assembly as set forth in claim 6, wherein said first swing link assembly includes a first swing link biasing member connected between said first swing link and said first close face of said tailgate that biases said first swing link towards said stored position and wherein said second swing link assembly includes a second swing link biasing member connected between said second swing link and said second close face of said tailgate that biases said second swing link towards said stored position.

14. The tailgate assembly as set forth in claim 13, wherein said first swing link biasing members are torsion springs.

15. The tailgate assembly as set forth in claim 6, further comprising:
- a first re-latch bumper configured to mount to the first bedside of the vehicle, said first re-latch bumper positioned to contact said first swing link distal end and return said first swing link to said stored position when said tailgate is rotated to said stowed position; and
- a second re-latch bumper configured to mount to the second bedside of the vehicle, said second re-latch bumper positioned to contact said second swing link distal end and return said second swing link to said stored position when said tailgate is rotated to said stowed position.

16. The tailgate assembly as set forth in claim 6, wherein said first swing link pivot is disposed along said first close face of said tailgate such that said first swing link is positioned between said first close face of said tailgate and said first bedside of the vehicle when said tailgate is in said stowed position and wherein said second swing link pivot is disposed along said second close face of said tailgate such that said second swing link is positioned between said second close face of said tailgate and said second bedside of the vehicle when said tailgate is in said stowed position.

17. The tailgate assembly as set forth in claim 16, wherein said first swing link rotates between said stored position and said deployed position in a first swing link plane that is disposed between said first close face of said tailgate and the first bedside of the vehicle and wherein said second swing link rotates between said stored position and said deployed position in a second swing link plane that is disposed between said second close face of said tailgate and the second bedside of the vehicle.

18. A tailgate assembly for a vehicle having a cargo area disposed between a first bedside and a second bedside, said tailgate assembly comprising:
- a tailgate having an exterior surface, an interior surface, and a perimeter defined by a first close face, a second close face, a top, and a bottom, said tailgate configured to be pivotally supported on the first besides of the vehicle for movement between a stowed position and a plurality of open positions;
- at least one tailgate latch assembly releasably retaining said tailgate in said stowed position;
- a first support cable extending between a first support cable bedside end and a first support cable tailgate end, said first support cable bedside end configured to be attached to the first bedside of the vehicle;
- a first swing link assembly including a first swing link extending between a first swing link proximal end and a first swing link distal end, a first swing link pivot pivotally connecting said first swing link proximal end to said first close face of said tailgate to permit rotation of said first swing link between a stored position and a deployed position, and a first swing link latch assembly releasably retaining said first swing link in said stored position;
- said first support cable tailgate end connected to said first swing link distal end such that said tailgate is limited to rotation between said stowed position and a first open position when said first swing link is in said stored position and further rotation of said tailgate between said first open position and a second open position is permitted when said first swing link is in said deployed position;

at least one step disposed along said interior surface of said tailgate that provides access to said cargo area when said tailgate is in said second open position; and a first re-latch bumper configured to mount to the first bedside of the vehicle, said first re-latch bumper positioned to contact said first swing link distal end and return said first swing link to said stored position when said tailgate is rotated to said stowed position.

19. The tailgate assembly as set forth in claim 18, wherein said first swing link pivot is disposed along said first close face of said tailgate such that said first swing link is positioned between said first close face of said tailgate and said first bedside of the vehicle when said tailgate is in said stowed position.

20. The tailgate assembly as set forth in claim 19, wherein said first swing link rotates between said stored position and said deployed position in a first swing link plane that is disposed between said first close face of said tailgate and the first bedside of the vehicle.

* * * * *